United States Patent Office 3,150,517
Patented Sept. 29, 1964

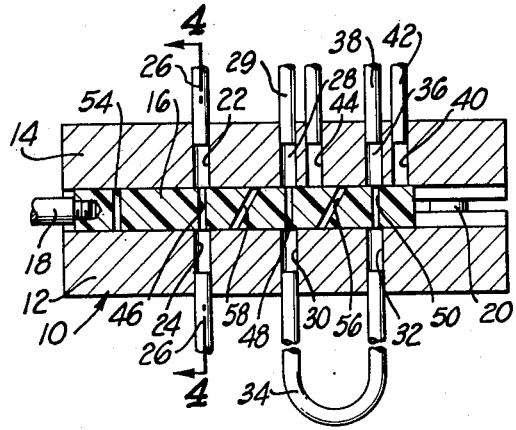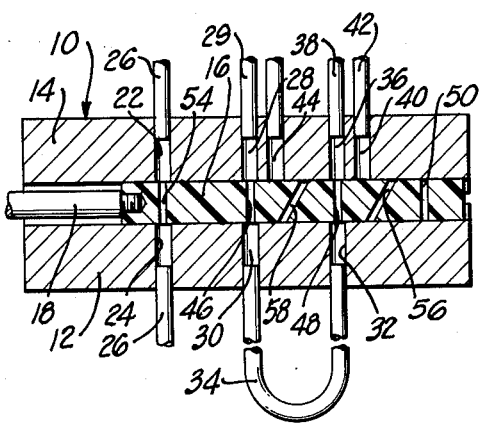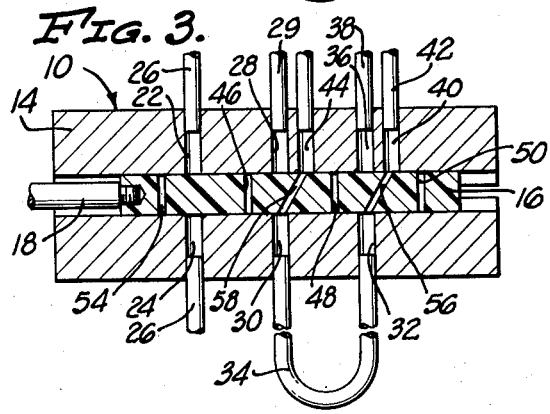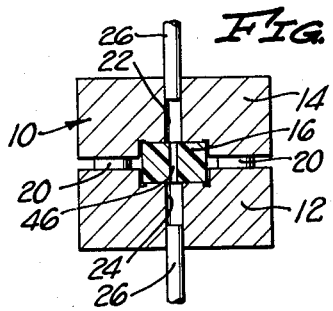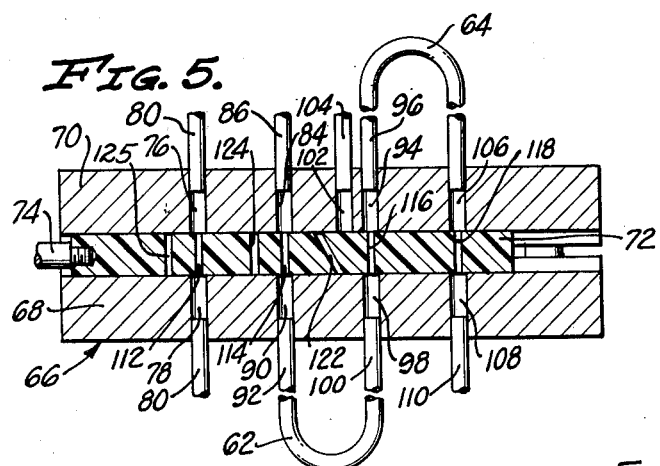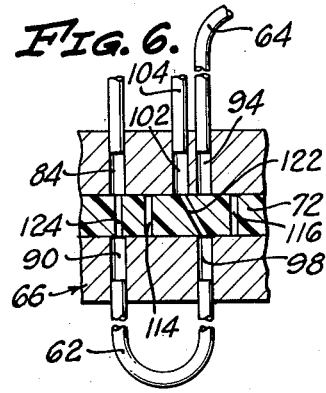

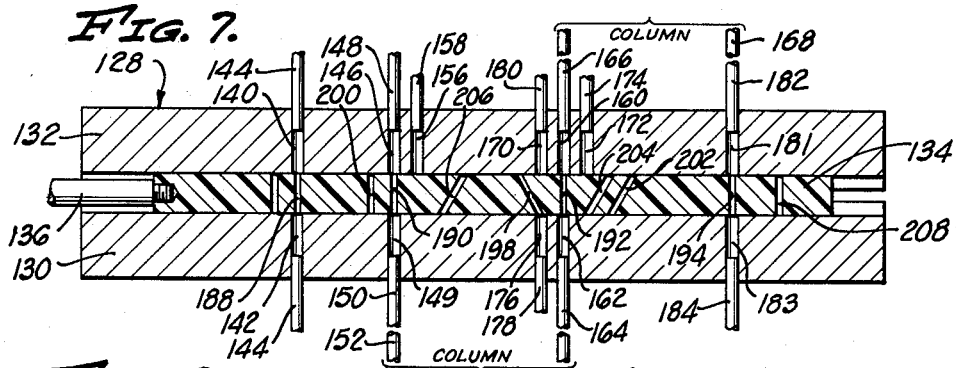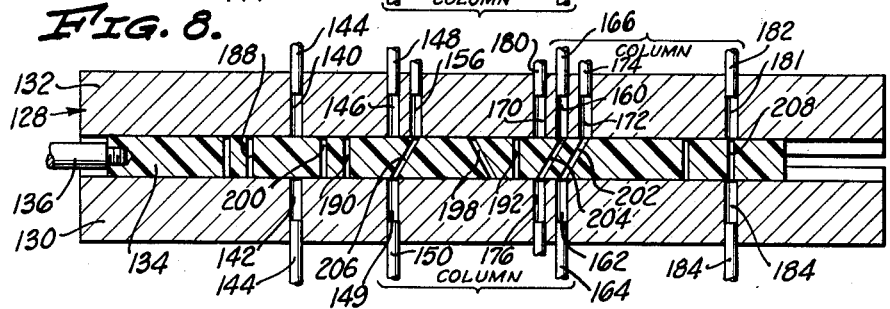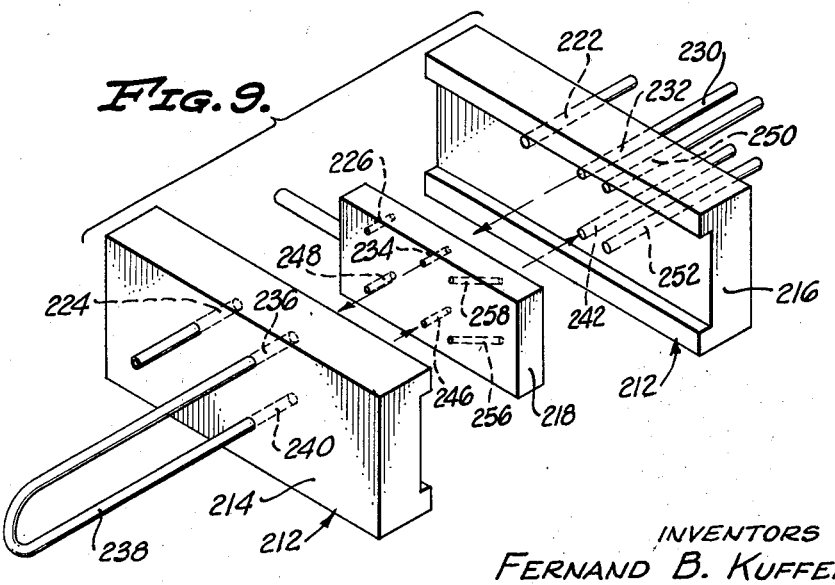

3,150,517
GAS CHROMATOGRAPH INTEGRATED VALVE
Fernand B. Kuffer and Ralph A. Dora, Anaheim, Calif., assignors to Beckman Instruments Inc., a corporation of California
Filed June 26, 1961, Ser. No. 119,728
5 Claims. (Cl. 73—23.1)

The present invention relates in general to gas chromatography and, more particularly provides a valve of an improved structure that facilitates the conducting of gas chromatographic analyses.

Gas chromatography is an analytical technique widely used for the qualitative and quantitative analysis of the components of a sample. The apparatus used in conventional gas chromatography includes a column, sometimes two or more columns in series, each of which may contain an inert granular substance, e.g., diatomaceous earth or ground fire brick, and normally but not always the granular solid serves as a support for an immobile, partition liquid. The partition liquid has a very low vapor pressure at the temperature at which it is used. A flow of a gas, for example helium, usually called a carrier gas, is passed through the chromatographic column. A small sample of the volatile mixture to be analyzed is measured by a sampling valve and injected into the gas stream immediately preceding the column. The components of the sample are transported through the column by the carrier gas with speeds which depend upon the solubility of the components in the partition liquid. The components of the sample then emerge individually from the column and can be detected at the exit by some suitable device; for example, a device for measuring the thermal conductivity of the carrier gas versus the thermal conductivity of the carrier gas mixed with the component.

It sometimes happens that, in the chromatographic analysis of a sample containing both heavy and light components, the interest is primarily in the light components which are rapidly separated and eluted from the column, say in five minutes or so. The heavier components of the sample may have a holdup time of say an hour or so within the chromatographic column. When this type of analysis is being run, it is common practice to backflush the chromatographic column with a stream of the carrier gas or other suitable flushing gas to remove the heavier ends at the inlet end of the chromatographic column. It will be appreciated that through backflushing the heavy end components of the sample may be removed in say about five minutes whereas the continuation of forward flow of the carrier gas would have required about 55 minutes or so for the last of the heavy components to leave the column. Backflushing of this type, it will be seen, will free the column for another analysis. Suitable valving and lines must be supplied, in addition to the basic apparatus, to permit backflushing.

In some chromatographic analyses, two chromatographic columns are connected in series. The first column is employed to effect a gross separation of the heavy components from the light components and also serving to provide a separation of the individual heavier components. The second column serves to provide a satisfactory separation of the individual light components. The second column frequently does not carry a partition liquid upon its inert granular solids, there being no need for the partition liquid for separation of the lighter components. It is important in such a two column chromatographic system that the heavier components of the sample not be permitted to enter the second column as they will absorb or adsorb too "heavily," remaining permanently within the column until stripped by extraordinary means, that is to say the carrier gas is inadequate in effecting a removal of the heavier components from the second column. With such a two column arrangement, it is common practice to provide suitable valving and conduits to vent the flow of the heavier components as they leave the first column to a suitable detector or other disposal. Additionally, it is sometimes desirable to provide suitable apparatus including valving and lines for backflushing the first column and for simultaneously continuing flow through the second column. It will be appreciated that the lines and valving adequate to achieve the purpose of such a system may become quite complex.

The improved valve of the invention which may be properly described as a programming valve provides for sample injection and for initiating other operative procedures frequently practiced in a gas chromatographic analysis. For instance, the valve of the invention in one of its preferred forms not only permits the measuring and injection of the sample into the carrier gas stream but in one of its positions directs a backflushing gas stream through the gas chromatographic column. Still another form of the valve of the invention serves to program the several steps normally attending a gas chromatographic analysis employing two columns in series. It will be appreciated that the use of the improved valve of the invention results in a more compact chromatographic apparatus having less valving and fewer lines. Additionally, the programming valve of the invention permits the control of the analysis at one site.

In one of its preferred forms, the improved valve of the invention comprises a housing having a programming block or valve slidably held therein. The housing carries a number of passages adapted to be interconnected to various patterns by the programming block. The housing passages include a sample-in passage and a sample-out passage that are connected to the sample stream. The housing in addition possesses a carrier gas inlet passage connectible to the carrier gas stream and a column-in passage that is adapted to be coupled to the inlet side of the chromatographic column. A column-out passage of the housing upon installation of the valve is connected to the outlet side of the chromatographic column. Additionally, the housing carries a detector-in passage adapted for connection to the detector, a flushing gas inlet passage adapted for connection to a flushing gas source and a vent passage which may be connected to a second detector or possibly to disposal.

The programming block carried by the housing of the valve of the preceding paragraph is movable through a range of positions relative to the valve housing. This programming block is provided with several ports that when properly positioned provide communication between various ones of the housing passages. In one position the programming block provides a first port which interconnects the sample-in and the sample-out passages and simultaneously, interconnection of the carrier gas inlet passage and the column-in passage is accomplished by a second port of the programming block. A third port of the programming block in this first position serves to interconnect the column-out passage and the detector-in passage. In a second position of the programming block the aforementioned first port of the block interconnects the carrier gas inlet passage and the column-in passage to inject a measured sample, while the second port of the block serves to interconnect the column-out passage and the detector-in passage. In a still third position of the programming block within the valve housing, a fourth port of the programming block interconnects the flushing gas inlet passage and the column-out passage, while a fifth port of the block serves to interconnect the column-in passage and the aforementioned vent passage.

The valve of this first embodiment serves as a sample injection valve and may also be utilized to backflush the chromatographic column.

The preferred structure of the improved valve of the invention has a housing and valve arrangement, generally like that illustrated and described in copending application, Serial No. 120,886 which is a continuation-in-part application of Serial No. 56,713 Charlton et al., now abandoned, assigned to the same assignee as the subject application. The valve of the referenced application employs two body members which are held in close slidable contact. The valve element itself is self-lubricating and preferably nonmetallic. The subject matter of the copending application is incorporated herein by reference. The valve element or programming block may consist primarily of polytetrafluoroethylene to which an additive is incorporated. For example, adding 25% by weight of powdered glass to the polytetrafluoroethylene produces optimum conditions of low friction, easy machinability, low brittleness, and the like. Alternatively, adding approximately 15% by weight of calcium fluoride to the polytetrafluoroethylene provides satisfactory results. Various other additives, such as metal salts and powdered metals, may be used. However, any additive which is used must have a melting temperature higher than the molding temperature of the polytetrafluoroethylene, and must be inert with respect to the sample and carrier streams. The quantity of additive will not normally exceed about 35% by weight of the polytetrafluoroethylene, and will usually be at least 10% to 15% by weight.

It will be appreciated that the features of the improved valve of the present invention are not necessarily limited to incorporation in a valve of the exact type illustrated in the copending Charlton et al. application. The sliding valve member or programming block of the improved valve of the invention differs from that illustrated in the copending application in being substantially longer, similarly the housing of the improved valve is accordingly longer than that illustrated and described in the copending application in order to accommodate the several extra passages of the new valve.

In another embodiment of the improved valve of the invention, the valve housing has additional passages including a second column-in passage for connection to the inlet side of a second chromatograph column, along with a second column-out passage connectible to the outlet side of the second chromatograph column. As in the embodiment earlier described, the housing is also provided with a sample-in passage and a sample-out passage for interconnection respectively to the sample stream and with a carrier gas inlet passage connectible to the carrier gas stream. As before, the column-in passage is provided for connection to the inlet side of the first chromatograph column and a column-out passage for connection to the outlet side of the first chromatograph column. The housing of the valve of this second embodiment also contains a first column exit passage which may be employed to remove the carrier gas stream exiting from the first column directly to a detector or disposal, thereby avoiding passage of the stream through the second column. As in the earlier described form of the improved valve, the programming block is movable through a range of positions which permits the alignment of several ports of the programming block to provide communication between various ones of the housing passages. In a first position of the programming block, four ports of the block come into play, with a first port serving to interconnect the sample-in passage and the sample-out passage. A second port acts to complete communication between the carrier gas inlet passage and the first column-in passage, while a third port of the programming block interconnects the first column-out passage and the second column-in passage. A fourth port of the programming block provides communication between the second column-out passage and the detector-in passage. In a second position of the programming block within the valve housing, the aforementioned first port interconnects the carrier gas inlet passage and the first column-in passage to inject a measured sample, while the second port acts to interconnect the first column-out passage and the second column-in passage. The third port of the programming block in this second position provides communication between the second column-out passage and the detector-in passage. In a still third position of the programming block, a fifth port of the programming block provides an interconnection between the first column-out passage and the first column-exit passage, while a sixth port of the block provides an interconnection between the carrier gas inlet passage and the first column-in passage. In the third position, the second column-in passage and the second column-out passage are isolated from any ports of the programming block.

This second embodiment of the valve of the invention like the first permits accurate measurement and introduction of sample from the sample stream into the carrier gas stream. By proper selection of position of the programming block, the carrier gas flow from the first column may be sent via the first column exit passage directly to a detector or to disposal, while in a third position of the valve carrier gas flows from the first column through the second column to the detector.

The foregoing objects and advantages of the invention, together with various other objects and advantages, will become evident to those skilled in the art in light of the following disclosure and drawings. The drawings illustrate and the disclosure describes preferred embodiments of the apparatus of the present invention.

In the drawings:

FIG. 1 is a schematic representation of one embodiment of the valve of the invention, showing the programming block of the valve in its normal operating position;

FIG. 2 illustrates the valve of FIG. 1 in a second position, wherein the programming block has been moved to bring about an injection of sample into a carrier gas stream;

FIG. 3 is another schematic representation of the valve of FIGS. 1 and 2 with the programming block in a third position which provides for backflushing the chromatograph column with a suitable flushing gas;

FIG. 4 is a cross-sectional view taken along line 4—4 of FIG. 1;

FIG. 5 is a schematic representation of still another form of the valve of the invention suitable for use with two chromatograph columns connected in series, with the programming block of the valve in its normal operating position;

FIG. 6 is a fragmentary representation of the valve of FIG. 5 with the programming block in a second position which permits bypassing of the second gas chromatograph column with direction of the carrier gas stream to a second detector or to disposal;

FIG. 7 is a schematic representation of still another form of the improved valve of the invention for use with two gas chromatograph columns, with the valve occupying its normal operating position;

FIG. 8 illustrates the valve of FIG. 7 with the programming block in another one of its possible positions wherein the first column is being backflushed and the second column is simultaneously subjected to a foreflushing; and FIG. 9 is an exploded view, illustrating still another form of the valve of the invention with the several passages of each half of the valve housing being provided in two tiers differing from the earlier embodiments wherein the several passages are linearly laid out the length of the valve housing.

There is illustrated in FIGS. 1-4 one form of the valve of the invention which form is particularly suitable for use with a single chromatograph column. The valve is made up of a valve housing 10 comprising two body members 12 and 14 which are held in close slidable contact with a programming block 16. The programming block is movable through a range of positions relative to the valve housing 10 in response to an actuator (not shown) acting through a rod 18. Bolts 20 hold the two body members 12 and 14 under compression in slidable engagement with the programming block 16 lying therebetween. Two pairs of bolts 20 are respectively located at opposite ends of the housing 10 and in a preferred embodiment means are incorporated as disclosed in copending application Serial No. 56,713, Charlton et al., for providing flexibility to the bolts 20, for example by supplying a leaf-type spring between the adjacent bolts of each pair with opposite ends of the leaf spring engaging the undersides of the heads of the bolts, thus imparting a degree of flexibility to the structure. The two leaf springs also equalize the clamping force applied to the two body members 12 and 14 of the housing by the several bolts 20. The manner of joining the two body members together with the programming block therebetween being no part of the instant invention, reference is made to the copending application Serial No. 56,713 for further information as to one possible construction of the valve of the invention.

The housing 10 carries a number of passages including a sample-in passage 22 and a sample-out passage 24. The two sample passages are connected respectively to a sample stream carried by a line 26. The housing 10 contains additionally a carrier gas inlet passage 28 which is connected to a carrier gas line 29, a column-in passage 30 and a column-out passage 32. The column-in passage and the column-out passage are connected respectively to the inlet and outlet of a gas chromatograph column 34. A detector-in passage 36 which is in alignment with the aforementioned column-out passage 32 connects through a line 38 to a detector (not illustrated). The detector may be any of the many types commonly employed in gas chromatography including a thermal conductivity or flame detector. A flushing gas inlet passage 40 is housed in the body member 14 adjacent to the detector-in passage 36. Flushing gas which may be of the same composition as the carrier gas is supplied through a line 42 to the inlet passage 40. The valve illustrated in FIGS. 1–4 carries one more passage within its housing 10, namely a vent passage 44 which is immediately adjacent the earlier mentioned carrier gas inlet passage 28. The vent passage may be connected, for example, to a detector or to disposal or other suitable connection.

The programming block 16 of the valve of FIGS. 1–4 carries several ports that when properly positioned provide communication between various ones of the earlier described housing passages. With reference to FIG. 1 the programming block 16 is illustrated in one of its possible positions and in this first position a first port 46 of the programming block interconnects the sample-in passage 22 and the sample-out passage 24. A second port 48 spaced from the first port provides communication between the carrier gas inlet passage 28 and the column-in passage 30 while a third port 50, parallel to the other two ports and spaced at the opposite end of the programming block from the first port 46, serves to interconnect the column-out passage 32 and the detector-in passage 36 when the programming block is in the position of FIG. 1.

The programming block 16 is in its sample injection position in FIG. 2 and there it will be seen that the first port 46 which formerly interconnected the two sample passages 22 and 24 has moved to provide communication between the carrier gas inlet passage 28 and the column-in passage 30. It will be appreciated that with movement of the programming block 16 from the position of FIG. 1 to the position of FIG. 2 a measured volume (slug) of sample entrapped in the first port 46 is thereby injected into the carrier gas stream flowing to the column 34. In the position of FIG. 2, the second port 48 is moved into position to complete communication between the column-out passage 32 and the detector-in passage 36. It will also be seen that the sample stream of line 26 may continue to flow through a relief port 54 located at the rod end of the programming block 16.

The third position of the programming block is illustrated in FIG. 3 and in this position a fourth port 56 of the programming block interconnects the flushing gas inlet passage 40 and the column-out passage 32. A fifth port 58 provides communication between the column-in passage 30 of the body member 12 and the vent passage 44 of the body member 14. With the setting of the programming block 16 in the position of FIG. 3, the gas chromatographic column 34 may be backflushed. It will be noted that the fourth port 56 and the fifth port 58 of the programming block 16 are parallel to each other but set at an angle to the other ports of the block.

The valve of FIG. 5 is particularly suitable for use with two gas chromatographic columns such as columns 62 and 64 placed in series with each other. The valve of FIG. 5, like that earlier described, comprises a housing 66 made up of two body members 68 and 70 that are held in slidable engagement with a programming block 72 placed therebetween. The programming block is actuated by a rod 74 through a range of positions relative to the valve housing 66. The programming block 72 carries several ports that when correctly positioned provide communication between various ones of several housing passages. The passages of the housing 66 include a sample-in passage 76 placed in alignment with a sample-out passage 78. A line 80 carries the sample stream to and away from the valve proper and the sample passages 76 and 78. The carrier gas inlet passage 84 connected to a carrier gas line 86 is spaced in parallel relationship to the two foregoing sample passages 76 and 78 and in alignment with a first column-in passage 90 which latter passage is housed in the body member 68 and connected to the first gas chromatographic column 62 through a suitable line 92. The body member 70 houses a second column-in passage 94 spaced in parallel relationship from the carrier gas inlet passage 84. This second column-in passage 94 is connected through a suitable line 96 to the second gas chromatographic column 64. The second column-in passage 94 is in alignment with but spaced from (being separated by the programming block 72) a first column-out passage 98. The latter passage which is housed in the body member 68 is connected through a suitable line 100 to the outlet of the first gas chromatographic column 62. A first column exit passage 102 is carired by the body member 70 in close parallel relationship to the earlier mentioned second column-in passage 94. The first column exit passage 102 may be connected through a line 104 commonly to a detector (not shown). The line 104 may be provided with a restrictor that assures the same back pressure to the system that is obtainable with the flowing of the carrier gas stream through columns 62 and 64 in series. The first column exit passage 102 may in some instances be connected to disposal. A second column-out passage 106 is placed toward the outside edge of body member 70 in parallel relationship to the second column-in passage 94 and in alignment with a detector-in passage 108 that is housed in the body member 68. The latter passage 108 is normally connected through a suitable line 110 to a detector not illustrated.

The programming block 72 in FIG. 5 occupies its normal operating position with the sample stream of line 80 passing through a first port 112 which interconnects the sample-in passage 76 and the sample-out passage 78. A second port 114 of the programming block which is placed inwardly of the first port 112 interconnects the carrier gas inlet passage 84 and the first column-in passage 90. It will be seen that the second port 114 permits flow of the carrier gas of line 86 through the valve, thence to the first gas chromatographic column 62. A third port 116 of the programming block 72 acts to interconnect the first column-out passage 98 to the second column-in passage 94. A fourth port 118 placed outwardly of the third port 116 within the programming block 72 serves to interconnect the second column-out passage 106 and the detector-in passage 108. In a second position of the programming block, which is not specifically illustrated, but which resembles generally the second position of the first described valve (see FIG. 2) the first port 112 which contains an entrapped volume of the sample is moved to align with the carrier gas inlet passage 84 and the first column-in passage 90. It will be seen that through this actuation of the valve that a measured amount of sample is introduced into the carrier gas stream flowing to the first chromatographic column 62. In the second position, the second port 114 aligns with the first column-out passage 98 and the second column-in passage 94 while the third port 116 interconnects the second column-out passage 106 and the detector-in passage 108.

The programming block 72 in a third position of its range which is illustrated in the fragmentary FIG. 6 positions an angled fifth port 122 in communication with the first column-out passage 98 and first column exit passage 102. A sixth port 124 of the programming block in the third position provides an interconnection between the carrier gas inlet passage 84 and the first column-in passage 90. In this third position, the second column-in passage 94 and the second column-out passage 106 are isolated from any of the ports of the programming block 72. The carrier gas stream with the programming block in the third position does not enter the second gas chromatographic column but leaves the valve by the aforementioned first column exit passage 102 which may be connected to a second detector. The sample stream of line 89 in this third position continues to flow through port 125 of the programming block 72. It will be appreciated that the valve of FIGS. 5 and 6 is particularly suitable to the handling of a sample containing a series of light components along with a series of heavy components. In such a sample the light components will rapidly elute from the first chromatographic column incompletely separated. For this reason it is desirable that the light components of the sample be passed to the second chromatographic column 64 which effects a suitable separation of these components. The heavier components within the first chromatographic column 62 leave that column with a satisfactory separation and may be taken directly through the first column exit passage 102 of the valve and line 104 to the detector. In the event there is no interest in the analysis of the heavier components they may be sent directly to disposal through line 104. Actually the components which have the same characteristics in relation to the first column are sent to the second column for separation. In a homologous series, the materials may be aptly described as light ends, but in other cases, drastically different compounds may come out together to be separated in the second column, for instance nitrogen and methane.

It will be appreciated that while the first chromatographic column 62 is being cleared of the heavier components the light components are so to speak trapped within the second chromatographic column 64, there being no ingress to or egress from that column. It has been experienced that the several light components of the sample will hold their respective positions within the second chromatographic column 64 during this interval. Following clearance of the heavier components of the sample from the first chromatographic column 62 via the first column exit passage 102, the programming block 72 is shifted once again to the position of FIG. 5 and the carrier gas passes through the first chromatographic column 62, entering the second chromatographic column 64 where it serves to complete separation of the light components of the sample and bring about their transport through line 110 to the detector. It will be seen that in the valve of FIGS. 5 and 6 all of the ports of the programming block 72 except the fifth port 122 are parallel to each other and to the several housing passages.

The valve illustrated in FIGS. 7 and 8 is capable of all the operations of the two valves of FIGS. 1–4 and FIGS. 5–6 respectively, and in addition provides other features. The versatile valve of FIGS. 7–8, like the two earlier described valves, comprises a housing 128 made up of two body members 130 and 132 which are held in close slideable engagement with a programming block 134. The programming block 134 is movable through a range of positions relative to the valve housing by a rod 136 connected to an actuator not illustrated. Various actuators are commercially available suitable for movement of the programming blocks and may be either of the hydraulic or pneumatic type. Solenoid operated actuators are also available.

The housing 128 carries a number of passages including a sample-in passage 140 and a sample-out passage 142 which are connected respectively to a sample stream line 144. It will be noted that the two sample passages are in alignment with each other and are spaced apart by the thickness of the programming block 134. A carrier gas inlet passage 146 connected to a carrier gas line 148 is spaced in parallel relationship to the two sample passages and in alignment with a first column-in passage 149 which latter passage is coupled through a suitable line 150 to a first gas chromatographic column 152. The carrier gas inlet passage 146 has spaced in close parallel relationship to it and inwardly of it, a first column backflush or rearward vent 156 which may be connected through a line 158 to a detector or possibly to disposal. The body member 132 houses a second column-in passage 160 which occupies the same relative position as the carrier gas inlet passage 146 at the opposite end of the valve housing. A first column-out passage 162 is disposed in the other body member 130 in alignment with the aforementioned second column-in passage 160. The first column-out passage is connected through a suitable line 164 to the outlet side of the first column 152. Similarly, the second column-in passage 160 is coupled through a line 166 to the inlet side of the second chromatographic column 168.

The second column-in passage 160 has respectively on its opposite sides two closely spaced and parallel passages, namely a first column forward vent passage 170 and a first column flushing inlet passage 172, the latter passage being spaced outwardly of the former. The first column flushing gas inlet passage 172 is connected through a line 174 to a suitable flushing gas source. The latter two passages are housed in the body member 132. The other body member 130 carries a second column flushing gas inlet passage 176 which in the particular valve embodiment illustrated is in alignment with the first column forward vent passage 170, although it need not be. The second column flushing gas inlet passage 176 is coupled through a suitable line 178 to a gas source. The first column forward vent passage 170 is connected through a line 180 to disposal or in the usual practice to a detector.

The housing 128 near one of its ends carries a second column-out passage 181 that is connected through a line 182 to the outlet side of the second chromatographic column 168. The body member 130 of the housing 128 carries a detector-in passage 183 that is coupled through a suitable line 184 to a detector (not shown).

The programming block or valve member 134, as earlier mentioned, is movable through a range of positions relative to the valve housing 128 and is provided with several ports which when correctly located relative to the housing provide communcation between various ones of the housing passages. The programming block 134 includes a first port 188 which serves to interconnect the sample-in passage 140 and the sample-out passage 142 with the programming block located in the position of FIG. 7. A second port 190 interconnects the carrier gas inlet passage 146 to the first column-in passage 149 with the valve adjusted as in FIG. 7. A third port 192 acts to interconnect the first column-out passage 162 and the second column-in passage 160, while a fourth port 194 completes the communication between the second column-out passage 181 and the detector-in passage 183. In a second position (not shown) of the valve of FIGS. 7 and 8, the first port 188 interconnects the carrier gas inlet passage 146 and the first column-in passage 149, thereby transferring a measured volume of the sample obtained from the sample stream into the carrier gas stream which flows to the two chromatographic columns. In this second position of the programming block, the second port 190 interconnects the first column-out passage 162 and the second column-in passage 160, while the third port 192 provides interconnection between the second column-out passage 181 and the detector-in passage 183.

In a still third position (not illustrated but generally similar to FIG. 6 of previous valve) of the valve, a fifth port 198 of the programming block 134 provides a connection between the first column-out passage 162 and the first column forward vent passage 170. A sixth port 200 of the programming block in this third position provides an interconnection of the carrier gas inlet passage 146 and the first column-in passage 149. It will be noted that in this particular position the second column-in passage 160 and the second column-out passage 181 are isolated from ports of the programming block.

The programming block 134 has a seventh port 202 which in the fourth position of the block as illustrated in FIG. 8, provides a connection between the first column flushing gas inlet passage 172 and the first column-out passage 162 and simultaneously an eighth port 204 of the programming block interconnects the second column flushing gas inlet passage 176 and the second column-in passage 160. In the fourth position a ninth port 206 of the programming block completes communication between the first column-in passage 149 and the first column rearward or backflush vent passage 156 and a tenth port 208 provides connection between the second column-out passage 181 and the detector-in passage 183. The valve placed in the described fourth position permits the simultaneous flushing of the two columns.

The valve of FIG. 9 is a more compact version of the valve earlier described and illustrated in FIGS. 1–4. With reference to FIG. 9 it will be seen that the valve housing 212 comprises two body members 214 and 216 which slidably hold therebetween a programming block 218. The valve of FIG. 9 differs principally from the earlier valve in that the two body members 214 and 216 and the programming block 218 all carry two superimposed rows of passages and ports respectively, whereas in the earlier version there was a linear layout of the several passages of the housing and similarly of the ports of the programming block.

Body member 216 houses a sample-in passage 222 which is in alignment with a sample-out passage 224 of the other body member 214. With the valve in its normal operating position, the programming block 218 presents a first port 226 in alignment with the two aforementioned sample passages 222 and 224. In this first position of the valve the carrier gas stream enters through a line 230 to the carrier gas inlet passage 232 which is connected through a second port 234 of the programming block 218 to a column-in passage 236 of the housing body member 214. The column-in passage 236 connects to the inlet side of a gas chromatographic column 238. The outlet side of the gas chromatographic column is coupled to a column-out passage 240 of the body housing member 214. In this first position of the valve, the column-out passage 240 connects with a detector-in passage 242 of the other housing body member 216 through a third port 246 of the programming block. It will be noted that the second and third ports 234 and 246 lie on a vertical line and that the column-in passage 236 and the column-out passage 240 of the housing 212 are similarly located. In a second position of the valve the programming block is moved to bring the first port 226 in alignment with the carrier gas inlet passage 232 and the column-in passage 236, thus transferring a measured volume of the sample into the carrier gas stream to the gas chromatographic column 238. With this positioning of the programming block, a fourth port 248 which is disposed immediately below the first port 226 within the programming block moves into alignment with the column-out passage 240 and the detector-in passage 242.

The housing body member 216 houses two other passages, namely a vent passage 250 and a flushing gas inlet passage 252 lying immediately beneath the former passage. With the placement of the programming block in its third position, a fifth port 256 of the programming block interconnects the flushing gas inlet passage 252 and the column-out passage 240. Simultaneously a sixth port 258 of the programming block placed immediately above port 256 serves to interconnect the column-in passage 236 and the vent passage 250. In this third position of the programming block, it is therefore possible to backflush the gas chromatographic column 238 with the flushing gas stream being sent either to vent or to a detector.

Although exemplary embodiments of the invention have been disclosed herein for purposes of illustration, it will be understood that various changes, modifications, and substitutions may be incorporated in such embodiments without departing from the spirit of the invention as defined by the claims which follow.

We claim:
1. An improved valve of the general type used for the introduction of a predetermined volume of a sample taken from a sample stream into a carrier gas stream flowing to a gas chromatographic column and thence to a detector, said improved valve comprising:

a housing having a programming block slidably held therein, said housing being provided with passages interconnectible in various patterns by said programming block, with said housing passages including a sample-in passage and a sample-out passage connectible respectively to the sample stream, a carrier gas inlet passage connectible to the carrier gas stream, a column-in passage connectible to the inlet side of the chromatographic column, a column-out passage connectible to the outlet side of said column, a detector-in passage connectible to the detector, a flushing gas inlet passage connectible to a flushing gas source, and a vent passage, said programming block being movable through a range of positions relative to the valve housing with the programming block being provided with several ports that when properly positioned provide communication between various ones of the housing passages, said programming block occupying one position wherein
  (a) a first port of the programming block interconnects the sample-in and the sample-out passages,
  (b) a second port of the programming block interconnects the carrier gas inlet passage and the column-in passage, and
  (c) a third port of the programming block interconnects the column-out passage and the detector-in passage,
said programming block occupying a second position wherein
  (a) the first port of the programming block interconnects the carrier gas inlet passage and the column-in passage, and
  (b) the second port of said programming block serves to interconnect the column-out passage and the detector-in passage, and
said programming block occupying a third position wherein
  (a) a fourth port of the programming block interconnects the flushing gas inlet passage and the column-out passage, and
  (b) a fifth port of the programming block serves to interconnect the column-in passage and the vent passage.

2. An improved valve of the general type that may be used for the introduction of a predetermined volume of a sample taken from a sample stream into a carrier gas stream flowing in series through a first gas chromatographic column and a second gas chromatographic column and thence to a detector, said improved valve comprising:

a housing having a programming block slidably held therein, said housing being provided with passages interconnectible in various patterns by said programming block, with said housing passages including a sample-in passage and a sample-out passage interconnectible respectively to the sample stream, a carrier gas inlet passage connectible to the carrier gas stream, a first column-in passage for connection to the inlet side of the first chromatograph column, a first column-out passage connectible to the outlet side of said first chromatographic column, a second column-in passage for connection to the inlet side of the second chromatographic column, a second column-out passage connectible to the outlet side of said second chromatographic column, a detector-in passage connectible to the detector, and a first column exit passage, said programming block being movable through a range of positions relative to the valve housing with the programming block being provided with several ports that when properly positioned provide communication between various ones of the housing passages, said programming block occupying one position wherein (a) a first port of the programming block interconnects the sample-in passage and the sample-out passage, (b) a second port of the programming block serves to interconnect the carrier gas inlet passage and the first column-in passage, (c) a third port of the programming block acts to interconnect the first column-out passage and the second column-in passage, and (d) a fourth port of the programming block interconnects the second column-out passage and the detector-in passage, said programming block occupying a second position wherein (a) the first port interconnects the carrier gas inlet passage and the first column-in passage, (b) the second port acts to interconnect the first column-out passage and the second column-in passage, (c) the third port serves to interconnect the second column-out passage and the detector-in passage, and (d) the fourth port of the programming block is isolated with respect to the foregoing housing passages, and said programming block occupying a third position wherein (a) a fifth port of the programming block provides an interconnection between the first column-out passage and the first column exit passage, (b) a sixth port of the programming block provides an interconnection between the carrier gas inlet passage and the first column-in passage, with said second column-in passage and said second column-out passage being isolated from any ports of the programming block, and (c) the first through the fourth ports are isolated with respect to the foregoing housing passages.

3. A valve in accordance with claim 2 wherein all of the ports of the programming block except the fifth port are substantially parallel to the several housing passages with said fifth port being set at an angle to the other passages of the programming block.

4. An improved valve of the general type that may be used for the introduction of a predetermined volume of a sample taken from a sample stream into a carrier gas stream flowing in series through a first gas chromatographic column and a second gas chromatographic column and thence to a detector, said improved valve comprising:

a housing having a programming block slidably held therein, said housing being provided with passages interconnectible in various patterns by said programming block, with said housing passages including a sample-in passage and a sample-out passage connectible respectively to the sample stream, a carrier gas inlet passage connectible to the carrier gas stream, a first column-in passage connectible to the inlet side of the first chromatographic column, a first column-out passage connectible to the outlet side of said first column, a second column-in passage for connection to the inlet side of the second chromatographic colmun, a second column-out passage connectible to the outlet side of said second chromatographic column, a detector-in passage for connection to the detector, a first column forward vent, a first column rearward vent, a first column flushing gas inlet passage, and a second column flushing gas inlet passage, said programming block being movable through a range of positions relative to the valve housing with the programming block being provided with several ports that when properly positioned provide communication between various ones of the housing passages, said programming block occupying one position wherein (a) a first port of the programming block acts to interconnect the sample-in passage and the sample-out passage, (b) a second port of the programming block interconnects the carrier gas inlet passage and the first column-in passage, (c) a third port of the programming block acts to interconnect the first column-out passage and the second column-in passage, and (d) a fourth port of the programming block interconnects the second column-out passage and the detector-in passage, said programming block occupying a second position wherein (a) the first port of the programming block interconnects the carrier gas inlet passage and the first column-in passage, (b) the second port of the programming block interconnects the first column-out passage and the second column-in passage, (c) the third port of the programming block provides interconnection of the second column-out passage and the detector-in passage, and (d) the fourth port is isolated with respect to the foregoing housing passages, said programming block occupying a third position wherein (a) a fifth port of the programming block serves to interconnect the first column-out passage and the first column forward vent passage, and (b) a sixth port of the programming block provides an interconnection of the carrier gas inlet passage and the first column-in passage, with the second column-in passage and the second column-out passage being isolated from ports of the programming block, and (c) the first through the fourth ports are isolated with respect to the foregoing housing passages, and said programming block occupying a fourth position wherein (a) a seventh port of the programming block interconnects the first column flushing gas inlet passage and the first column-out passage, (b) an eighth port of the programming block interconnects the second column flushing gas inlet passage and the second column-in passage, (c) a ninth port of the programming block interconnects the first column-in passage and the first column rearward vent passage, (d) a tenth port of the programming block interconnects the second column-out passage and the detector-in passage, and (e) the first through the sixth ports of the programming block are isolated with respect to the foregoing housing passages.

5. An improved valve of the general type used for the introduction of a predetermined volume of a sample taken from a sample stream into a carrier gas stream flowing to a gas chromatographic column and thence to a detector, said improved valve comprising:

a housing having a programming block slidably held therein, said housing being provided with passages adapted to be interconnected in various patterns by said programming block with said housing passages including a sample-in passage and a sample-out passage adapted to be connected respectively to the sample stream, a carrier gas inlet passage connectible to the carrier gas stream, a column-in passage adapted for connection to the inlet side of the chromatographic column, a column-out passage connectible to the outlet side of said column, a detector-in passage adapted for connection to the detector, a flushing gas inlet passage adapted for connection to a flushing gas source, and a vent passage, said programming block being movable through a range of positions relative to the valve housing with the programming block being provided with several ports that when properly positioned provide communication between various ones of the housing passages, said programming block occupying one position wherein (a) a first port of the programming block interconnects the sample-in and the sample-out passages, (b) a second port of the programming block interconnects the carrier gas inlet passage and the column-in passage, and (c) a third port of the programming block interconnects the column-out passage and the detector-in passage, said programming block occupying a second position wherein (a) the first port of the programming block interconnects the carrier gas inlet passage and the column-in passage, and (b) a fourth port of said programming block serves to interconnect the column-out passage and the detector-in passage, and said programming block occupying a third position wherein (a) a fifth port of the programming block interconnects the flushing gas inlet passage and the column-out passage, and (b) a sixth port of the programming block serves to interconnect the column-in passage and the vent passage.

References Cited in the file of this patent

UNITED STATES PATENTS

| | | |
|---|---|---|
| 2,846,121 | Ronnebeck | Aug. 5, 1958 |
| 2,972,888 | Lamkin | Feb. 28, 1961 |
| 2,981,092 | Marks | Apr. 25, 1961 |
| 3,000,218 | Marks et al. | Sept. 19, 1961 |

FOREIGN PATENTS

| | | |
|---|---|---|
| 1,182,564 | France | Jan. 19, 1959 |